United States Patent [19]

Sommargren

[11] Patent Number: 4,807,997

[45] Date of Patent: Feb. 28, 1989

[54] ANGULAR DISPLACEMENT MEASURING INTERFEROMETER

[75] Inventor: Gary E. Sommargren, Santa Cruz, Calif.

[73] Assignee: Zygo Corporation, Middlefield, Conn.

[21] Appl. No.: 119,846

[22] Filed: Nov. 12, 1987

[51] Int. Cl.$^4$ .............................................. G01B 9/02
[52] U.S. Cl. ..................................... 356/349; 356/363
[58] Field of Search ................ 356/349, 351, 358, 363

[56] References Cited

U.S. PATENT DOCUMENTS

| | | | |
|---|---|---|---|
| 4,329,055 | 5/1982 | Schaefer et al. | 356/346 |
| 4,688,940 | 8/1987 | Sommargren et al. | 356/358 X |
| 4,693,605 | 9/1987 | Sommargren | 356/349 |
| 4,717,250 | 1/1988 | Sommargren | 356/349 |

Primary Examiner—Davis L. Willis
Assistant Examiner—Matthew W. Koren
Attorney, Agent, or Firm—Bryan, Cave, McPheeters & McRoberts

[57] ABSTRACT

An angular displacement interferometer system capable of measuring accurately changes in angular displacement comprises a source (10) of a frequency stabilized input beam with two linear orthogonally polarized components; a tilted parallel plate or shear place (16) with regions of reflection, antireflection, and polarizing coatings for converting the input beam (12) into two separated, parallel, orthogonally polarized beams (30, 31); a half-wave retardation plate (29) located in one of the separated beams (31) for converting the two separated, parallel, orthogonally polarized beams (30, 31); into first and second beams which are spatially separated parallel, and have the same polarization (30, 33); a polarizing beamsplitter (40) and quarter-wave retardation plate (44) for transmitting the first and second beams (34, 35) to a fixed plano mirror (70) nominally perpendicular to the first and second beams for reflecting the first and second beams back into the quarter-wave retardation plate (44), polarizing beamsplitter (40), and retroreflector (48) for producing third and fourth beams (56, 67); a rhomboid-shaped glass element (72) attached to the mechanical apparatus whose angular displacement is to be measured, located such that the third and fourth beams enter adjacent faces and are refracted to produce fifth and sixth beams which are reflected from the fixed plano mirror (70) back through the rhomboid-shaped glass element (72) back through the quarter-wave retardation plate (44), beamsplitter (40), retardation plate (29) and shear plate (16) where the fifth and sixth beams are recombined into a single output beam (80) having two orthogonally polarized components in which the phase difference between the two components of the output beam (80) is related to the angular displacement; a polarizer (81) for mixing the orthogonal components of the output beam (80); a photoelectric detector (83) for producing an electrical measurement signal (85); and a phase meter/accumulator (90) for indicating the measured phase (92), the measured phase being related to the angular displacement.

30 Claims, 1 Drawing Sheet

ANGULAR DISPLACEMENT MEASURING INTERFEROMETER

CROSS-REFERENCE TO RELATED APPLICATION

This application is related to my copending U.S. patent application, Ser. No. 845,926, now U.S. Pat. No. 4,717,250, entitled "Angle Measuring Interferometer", filed Mar. 28, 1986; and Ser. No. 873,420, now U.S. Pat. No. 4,746,216, also entitled "Angle Measuring Interferometer", filed June 12, 1986, and is an improvement thereon.

BACKGROUND OF THE INVENTION

1. Field of the Invention

The present invention relates to apparatus for the measurement of changes in angular orientation. More particularly, the inventon relates to optical apparatus which is useful for high accuracy angular displacement metrology using interferometry.

2. The Prior Art

High accuracy linear displacement and angular displacement measurements are required in the machine tool industry and in the semiconductor fabrication industry. Linear displacement is commonly measured with an interferometer. Angular displacements are commonly measured with either an interferometer or an autocollimator.

There are numerous interferometer configurations which can be used to measure changes in angular orientation. In conventional interferometers, changes in angular orientation between two mirrors manifests itself, in general, as a change in fringe spacing and a rotation of the fringe pattern while changes in the linear displacement between the two mirrors manifests itself as a translation of the fringers. Thusly, it takes rather complex, time consuming processing to separate these effects in order to extract the desired angular information. Also, these interferometers have a very limited angular displacement measurement range. Therefore, for angular displacement measurements which require high accuracy and a large measurement range, these prior art interferometers are not useful.

An adaptation of a linear displacement interferometer has been used to make angular displacement measurements, see for example R. R. Baldwin, L. E. Truhe, and D. C. Woodruff, "Laser Optical Components for Machine Tool and Other Calibration," Hewlett-Packard Journal, pp. 14–16, April 1983. While this technique is useful for some applications, it is impractical to use this technique of attaching several massive retroreflectors to a rapidly rotating shaft in other applications.

Although autocollimators provide many of the desired characteristics, see for example D. Malacara, *Optical Shop Testing*, p. 467, John Wiley & Sons (1978), for high accuracy angular displacement measurements, interferometers and preferred because their measurements are based directly on a stable, fixed, built-in measurement unit, i.e., the wavelength of light, and they have a large measurement range.

Another technique, which measures the changes in angular orientation between two plane mirrors, is disclosed in my copenind U.S. patent applications, Ser. No. 845,926 entitled "Angle Measuring Interferometer," filed Mar. 28, 1986 and Ser. No. 873,420, also entitled "Angle Measuring Interferometer", filed June 12, 1986. While this technique is quite useful for some applications and overcome several disadvantages of the prior art, it has a limited measurement range, e.g. $\pm\frac{1}{2}$ degree and, therefore may not be as universal as desired.

The present invention, however, retains the preferred characteristics of both the autocollimator and the interferometer over a large measurement range while avoiding the serious limitations of prior art apparatus. In the present invention, the angular displacement measurement has a large measurement range, high resolution, a high slew rate, and is insensitive to linear displacements of the rotating optical element in any of three dimensions. The measurement of the present invention is also interferometric so that it is based on the wavelength of light. The improvements of the present invention thusly overcome the disadvantages of the prior art and allow the high accuracy, i.e., to a small fraction of an arc second, angular displacement measurement required for precision, high speed optical scanners.

SUMMARY OF THE INVENTION

In accordance with the instant invention, I provide an angular displacement interferometer system capable of measuring accurately changes in angular displacement comprising: (1) a source of a frequency stabilized input beam with two linear orthogonally polarized components which may or may not be of the same frequency; (2) means, most preferably a tilted parallel plate or shear plate with regions of reflection, antireflection, and polarizing coatings, for converting the input beam into two separated, parallel, orthogonally polarized beams; (3) means, most preferably a half-wave retardation plate, located in one of said separated beams, for converting the two separated parallel, orthogonally polarized beams into first and second beams which are spatially separated parallel, and have the same polarization; (4) means, most preferably a polarizing beamsplitter and quarter-wave retardation plate, for transmitting the first and second beams to; (5) means, most preferably a fixed plano mirror nominally perpendicular to the first and second beams for reflecting the first and second beams back into (6) means, most preferably the quarter-wave retardation plate, polarizing beamsplitter, and retroreflector, for producing third and fourth beams; (7) means, most preferably a rhomboid-shaped glass element, attached to the mechanical apparatus whose angular displacemet is to be measured, located such that the third and fourth beams enter adjacent polygon faces and are refracted to produce fifth and sixth beams which are reflected from the fixed plano mirror reflecting means back through the rhomboid-shaped glass element and back through the quarter-wave retardation plate, polarizing beamsplitter, with one beam passing through the half-wave retardation plate, and both through the tilted parallel or shear plate where the fifth and sixth beams are recombined into a single output beam having two orthogonally polarized components in which the phase difference between the two components of the output beam is related to said angular displacement; (8) means, most preferably a polarizer, for mixing the orthogonal components of the output beam; (9) means, most preferably a photoelectric detector for producing an electrical measurement signal; and (10) means, most preferably a phase meter/accumulator, for indicating the measured phase, the measured phase being related to the angular displacement.

THE DRAWINGS

In the drawings,

FIG. 1 depicts in schematic form one embodiment of the instant invention.

DETAILED DESCRIPTION OF THE INVENTION

Figure 1:
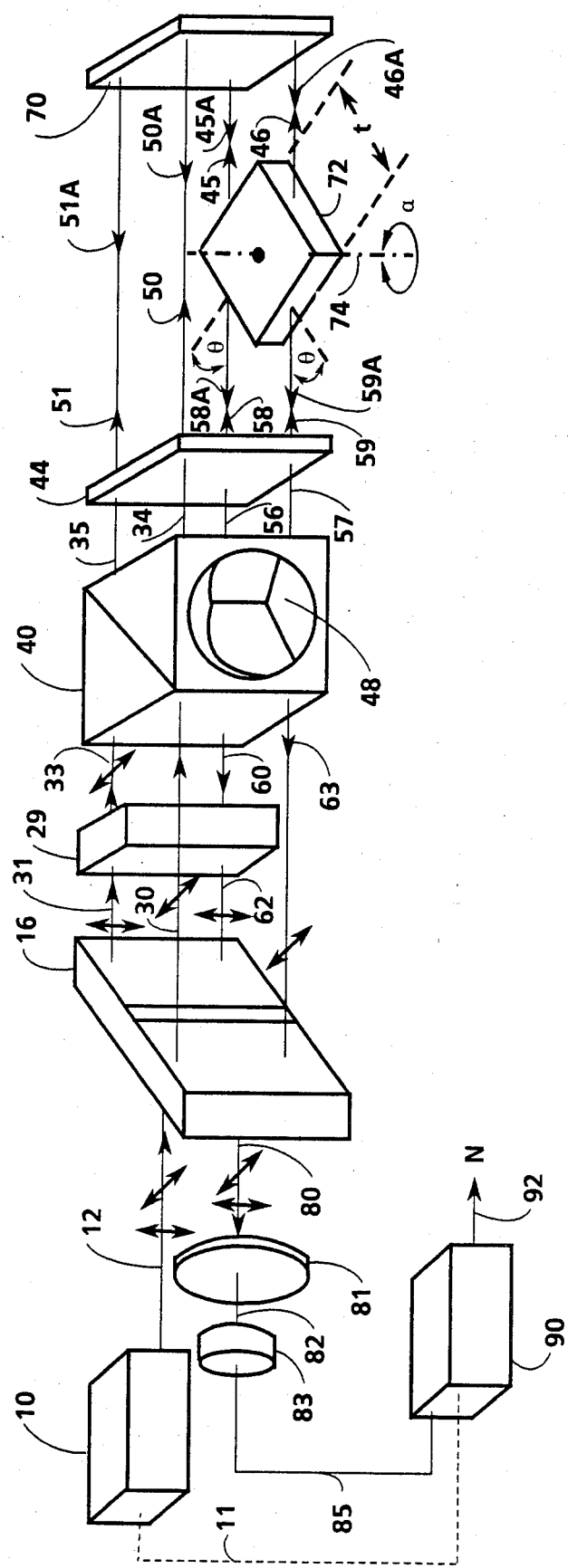

FIG. 1 depicts in schematic form one embodiment of the instant invention. While the apparatus has application for a wide range of radiation sources, the following description is taken by way of example with respect to an optical measuring system. Light source (10), which most preferably uses a laser, emits input beam (12) which is frequency stabilized and comprised of two linear orthogonally polarized components as indicated by the two arrows on beam (12), which may, or may not, be of the same optical frequency. If the frequencies are the same, see for example Downs, et al. U.S. Pat. No. 4,360,271, issued Nov. 23, 1982. If the frequencies are different, see for example, Bagley, et al. U.S. Pat. No. 3,458,259 issued July 26, 1969 and commonly owned U.S. Pat. No. 4,688,940 issued Aug. 25, 1987, in which instance source (10) would provide an electrical reference signal (11), shown by the dotted lines in FIG. 1, which would correspond to the frequency difference between the two stabilized frequencies. It should be noted that no such reference signal (11) is provided when the two orthogonally polarized components comprising input beam (12) are of the same frequency.

Beam (12) is incident on shear plate (16) which is a tilted glass substrate with optically flat surfaces which are mutually parallel. The function of tilted parallel plate (16) is to spatially separate the two polarization components using conventional polarization techniques as described in commonly-owned U.S. Pat. No. 4,693,605 issued Sept. 15, 1987. Thus, in the embodiment of FIG. 1, beam (12) is divided by tilted parallel plate (16), with the aid of antireflection coatings, a polarizing coating, and a reflective coating, to become vetically polarized beam (31) and horizontally polarized beam (30). Beam (31) passes through a single half-wave retardation plate (29) which rotates the linear polarization of beam (31) by 90° so that resultant beam (33) has the same polarization as beam (30). Beams (30) and (33) enter polarizing beamsplitter (40) and are transmitted as beams (34) and (35) respectively. Beams (34) and (35) pass through quarter-wave retardation plate (44) and are converted into circularly polarized beams (50) and (51), respectively. Beams (50) and (51) are reflected from a fixed plano mirror (70) to become beams (50A) and (51A). Beams (50A) and (51A) pass back through the quarter-wave retardation plate (44) and are converted back into linearly polarized beams that are orthogonally polarized to the original incident beam (34) and (35). Beams (50A) and (51A) are reflected by the polarizing beamsplitter (40), retroreflector (48), and polarizing beamsplitter (40) a second time to become beams (56) and (57), respectively. Beams (56) and (57) pass through the quarter-wave retardation plate (44) and are converted into circularly polarized beams (58) and (59), respectively. The tilted shear plate (16), half-wave retardation plate (29), polarizing beamsplitter (40), retroreflector (48), and quarter-wave retardation plate (44) preferably function in the manner described in detail in commonly-owned U.S. Pat. No. 4,693,605 issued Sept. 15, 1987, the contents of which are specifically incorporated by reference herein. Beams (58) and (59) are preferably incident on the adjacent polygon faces of a glass rhomboid (72). Glass rhomboid (72) is a solid glass element of refractive index, n, whose opposite polygon faces are parallel. The spacing between the two pairs of opposite polygon faces is equal and denoted by t. Glass rhomboid (72) is preferably mounted on the mechanical apparatus (not shown) whose angular displacement, $\alpha$, about rotation axis (74) is to be measured. The initial angle of incidence of beams (58) and (59) on the corresponding polygon faces of glass rhomboid (72) is denoted by $\theta$.

Beam (59) is refracted by glass rhomboid (72) as beam (45) which is displaced from and parallel to beam (59). Beam (58) is refracted by glass rhomboid (72) as beam (46) which is displaced from and parallel to beam (58). Beams (45) and (46) are reflected from the fixed plano mirror (70) as beams (45A) and (46A), respectively. Beams (45A) and (46A) are incident on the glass rhomboid (72) and are refracted as beams (59A) and (58A), respectively. Beams (58A) and (59A) pass back through the quarter-wave retardation plate (44) and are converted back into linerly polarized beams that are polarized the same as the original incident beams (34) and (35). Beams (58A) and (59A) are transmitted by and leave the polarizing beamsplitter (40) as beams (60) and (63), respectively. Beams (60) and (63) are mutually parallel by virtue of the inherent optical properties of the retroreflector (48) and the glass rhomboid (72). Beam (60) passes through the half-wave retardation plate (29) which rotates the linear polarization of beam (60) by 90° so that resultant beam (62) has a linear polarization which is orthogonal to beam (63). Beams (62) and (63) are combined by the shear plate (16), with the aid of an antireflection coating, a polarizing coating, and a reflective coating, each becoming one linearly polarized component of beam (80). For the initial position of the glass rhomboid (72), each component of beam (80) has transversed exactly the same optical path length through air and glass. When the glass rhomboid (72) is angularly displaced about the rotation axis (74) of the mechanical apparatus on which it is mounted, an optical path difference is introduced between the two polarization components of beam (80). This optical path difference, OPD, is expressed as $$OPD = t[\sqrt{n^2 - \sin^2(\theta + \alpha)} - \sqrt{n^2 - \sin^2(\theta - \alpha)} + 2\sin\alpha\sin\theta], \tag{1}$$

where t, n, $\theta$ and $\alpha$ have been previously defined. This optical path difference results in a phase difference between the two polarization components of beam (80). This phase difference is measured by passing beam (80) through polarizer (81), oriented at 45° to each polarization component, which mixes the two orthogonally polarized components in beam (80) to give beam (82). The interference between the two polarization components is detected by a photodetector (83) producing electrical signal (85). Electronic module or phase meter/accumulator (90) extracts the phase variation from electrical signal (85). When the two polarization components of beam (12) are of the same optical frequency, module (90) does not require reference signal (11), since there is no corresponding frequency difference, and conventionally extracts the phase variation from signal (85) such as in the manner described in aforementioned U.S. Pat. No. 4,360,271. However, when the two polarization components of beam (12) are of different frequencies, an additional sinusoidal electrical reference signal (11) equal in frequency to the difference between the two optical frequencies is required by electronic module (90), which reference signal (11), as previously mentioned, would be provided from source (10) in which instance photodetector (83) would detect the interference between the two frequency components as a sinusoidal intensity variation with a frequency approximately equal to the difference frequency between the two components of beam (12), and module (90) would preferably comprise a phase meter/accumulator such as described in the aforementioned U.S. Pat. No. 4,688,940, the contents of which are incorporated by reference herein. In either event, electronic module (90) provides output (92) which is directly propotional to the optical path difference given in the above equation.

The output (92) of module (90) is usually in terms of counts, N, which is related to the angular orientation of glass rhomboid (72) by $$N = (M/\lambda)(OPD) \qquad (2)$$

$$N = (Mt/\lambda) [\sqrt{n^2 - \sin^2(\theta + \alpha)} - \sqrt{n^2 - \sin^2(\theta - \alpha)} + 2\sin\alpha\sin\theta] \qquad (3)$$

where $\lambda$ is the wavelength of beam (12) and M is an integer which characterizes the degree to which module (90) can sub-divide the wavelength $\lambda$. Since M, t, $\lambda$ and n are constants, the above equation expresses the number of counts, N, for an angular displacement, $\alpha$. Although this relationship is quite linear over the range $-20° \leq \alpha \leq 20°$, the highest precision is achieved by generating a look-up table for $\alpha$ vs. N. For nominal values of M, t, $\lambda$, $\theta$, and n, the angular resolution of this angular displacement measuring interferometer is approximately 0.03 arc-second. In addition it is insensitive to linear displacement of the glass rhomboid (72) in any of three dimensions as well as rotation about the other two axes. It should be noted that the glass rhomboid (72) can be placed not only in beams (58) and (59) but also in beams (50) and (51), beams (51) and (58), or beams (50) and (59) with the instant invention functioning as disclosed.

The principal advantages of the instant invention are (1) relatively large measurement range, i.e. ±20°, (2) high resolution, i.e. 0.03 arc second, (3) insensitive to changes in the five other degrees of freedom of the glass rhomboid, (4) the measurement is based on the wavelength of light, and (5) it can measure angular displacements with high angular slew rates, e.g. 100 radians/sec.

While a preferred embodiment of the invention has been disclosed, obviously modification can be made therein, without departing from the scope of the invention as defined in the following claims.

What is claimed is:

1. An angular displacement interferometer system for accurately measuring changes in angular displacement of a mechanical apparatus, said system comprising a source of a frequency stabilized input beam with two linear orthogonally polarized components; means for converting said input beam into two separated, parallel, orthogonally polarized beams; means located in one of said separated beams for converting said two separated, parallel, orthogonally polarized beams into first and second beams which are spatially separated, parallel, and have the same polarization; means for transmitting said first and second beams; means disposed in the path of said transmitted beams for reflecting said first and second transmitted beams; means disposed in the path of said reflected beams for producing third and fourth beams; refractive means having a plurality of faces, said refractive means being attached to said mechanical apparatus located such that said third and fourth beams enter adjacent faces of said refractive means and are refracted to produce fifth and sixth beams which are reflected from said reflecting means back through said means attached to said mechanical apparatus and back through said refractive means attached to said mechanical apparatus and back through said means for producing said third and fourth beams, said means for converting said two separated beams into said first and second beams having the same polarization and said means for converting said input beams into said two orthogonally polarized beams wherein said fifth and sixth beams are recombined into a single output beam having two orthogonally polarized components in which the phase difference between the two components of said output beam is related to said angular displacement; means for mixing said orthogonal components of said output beam; means for producing an electrical measurement signal; and means for indicating a measured phase, said measured phase being related to said angular displacement.

2. A system in accordance with claim 1 wherein said two polarized components from said source are of the same frequency.

3. A system in accordance with claim 1 wherein said two polarized components from said source are of different frequencies.

4. A system in accordance with claim 1 wherein said means for converting said input beam into two orthogonally polarized beams comprises a tilted parallel plate.

5. A system in accordance with claim 1 wherein said means for converting said input beam into two orthogonally polarized beams comprises a shear plate with regions of reflection, antireflection, and polarizing coatings.

6. A system in accordance with claim 1 wherein said means for converting said two orthogonally polarized beams into said first and second beams having the same polarization comprises a half-wave retardation plate.

7. A system in accordance with claim 1 wherein said transmitting means comprises a polarizing beamsplitter and quarter-wave retardation plate.

8. A system in accordance with claim 1 wherein said means for reflecting said first and second transmitted beams comprises a fixed plano mirror nominally perpendicular to said first and second beams.

9. A system in accordance with claim 1 wherein said means for producing said third and fourth beams comprises a quarter-wave retardation plate, polarizing beamsplitter and a retroreflector.

10. A system in accodance with claim 9 wherein said means for transmitting said first and second beams further comprises means for producing said third and fourth beams.

11. A system in accordance with claim 10 wherein said means for transmitting said first and second beams comprises said polarizing beamsplitter and said quarter-wave retardation plate.

12. A system in accordance with claim 1 wherein sid refractive means attached to said mechanical apparatus comprises a rhomboid-shaped glass element.

13. A system in accodance with claim 1 wherein said means for mixing said orthogonal components comprises a polarizer.

14. A system in accordance with claim 1 wherein said means for producing an electrical measurement signal comprises a photoelectric detector.

15. A system in accordance with claim 1 wherein said means for indicating a measured phase comprises a phase meter/accumulator.

16. A system in accordance with claim 6 wherein said transmitting means comprises a polarizing beamsplitter and quarter-wave retardation plate.

17. A system in accordance with claim 16 wherein said means for reflecting said first and second transmitted beams comprises a fixed plano mirror nominally perpendicular to said first and second beams.

18. A system in accordance with claim 17 wherein said means for producing said third and fourth beams compries said quarter-wave retardation plate, said polarizing beamsplitter and a retroreflector.

19. A system in accordance with claim 18 wherein said means for transmitting said first and second beams further comprises means for producing said third and fourth beams.

20. A system in accordance with claim 19 wherein said means for transmitting said first and second beams comprises said polarizing beamsplitter and said quarter-wave retardation plate.

21. A system in accordance with claim 20 wherein said refractive means attached to said mechanical apparatus comprises a rhomboid-shaped glass element.

22. A system in accordance with claim 21 wherein said means for mixing said orthogonal components comprises a polarizer.

23. A system in accordance with claim 22 wherein said means for producing an electrical measurement signal comprises a photoelectric detector.

24. A system in accordance with claim 23 wherein said means for indicating a measured phase comprises a phase meter/accumulator.

25. A system in accordance with claim 24 wherein said two polarized components from said source are of the same frequency.

26. A system in accordance with claim 25 wherein said means for converting said input beam into two orthogonally polarized beams comprises a tilted parallel plate.

27. A system in accordance with claim 25 wherein said means for converting said input beam into two orthogonally polarized beams comprises a shear plate with regions of reflection, antireflection, and polarizing coatings.

28. A system in accordance with claim 24 wherein said two polarized components from said source are of different frequencies.

29. A system in accordance with claim 28 wherein said means for converting said input beam into two orthogonally polarized beams comprises a tilted parallel plate.

30. A system in accodance with claim 28 wherein said means for converting said input beam into two orthogonally polarized beams comprises a shear plate with regions of reflection, antireflection, and polarizing coatings.

* * * * *